United States Patent [19]

Samejima et al.

[11] Patent Number: 4,760,686
[45] Date of Patent: Aug. 2, 1988

[54] ATTACHMENT DEVICE FOR FRONT-MOUNTABLE WORKING IMPLEMENT

[75] Inventors: Kazuo Samejima; Teruo Shimamura; Takao Sakatsuji; Yoshikazu Togoshi; Masatami Fukuda; Hideo Kida, all of Osaka, Japan

[73] Assignee: Kubota Ltd., Osaka, Japan

[21] Appl. No.: 2,226

[22] Filed: Jan. 12, 1987

[30] Foreign Application Priority Data

Feb. 4, 1986 [JP] Japan ................................ 61-23309

[51] Int. Cl.$^4$ .......................................... A01D 34/66
[52] U.S. Cl. ................................... 56/15.8; 56/15.9; 56/DIG. 22
[58] Field of Search .................. 56/6, 13.6, 208, 15.8, 56/15.9, DIG. 22

[56] References Cited

U.S. PATENT DOCUMENTS

| 61-2020 | 1/1986 | JPX . | |
| 3,389,540 | 6/1968 | Zweegers | 56/15.9 |
| 3,402,540 | 9/1968 | Karlsson et al. | 56/208 |
| 3,550,364 | 12/1970 | Musgrave | 56/15.8 |
| 3,564,822 | 2/1971 | Engler | 56/6 |
| 3,654,749 | 4/1972 | Ostergren et al. | 56/15.8 |
| 3,834,142 | 9/1974 | Johnston et al. | 56/15.9 |
| 3,959,987 | 6/1976 | Halls | 56/15.8 |
| 4,218,865 | 8/1980 | Chaumont et al. | 56/15.8 |
| 4,384,444 | 5/1983 | Rossler | 56/15.8 |
| 4,441,306 | 4/1984 | Kuhn | 56/15.9 |

FOREIGN PATENT DOCUMENTS 61-2020 1/1986 Japan .

Primary Examiner—Paul J. Hirsch
Attorney, Agent, or Firm—Birch, Stewart, Kolasch, & Birch

[57] ABSTRACT

A device for attaching a working implement to the front of a running vehicle for performing work while following the ground comprises a pair of opposite inflexible links pivoted at their rear ends to the front of the vehicle. These inflexible links are movable upwardly or downwardly and each link has a front end for movably supporting the front portion of the implement about a lateral pivot. A pair of opposite suspenders are each mounted on a longitudinally intermediate portion of each link for suspending the rear portion of the implement, each of the suspenders including a rod assembly pivotally connectable to the implement's rear portion and a resilient member. The rod assembly is inserted in an upstanding state through the link and is movable axially thereof to thereby permit upward or downward movement of the implement's rear portion due to the movement of the implement about the pivot. The resilient member is provided around an upper portion of the rod assembly above the link and elastically bears against the link. A lift unit is provided between the vehicle and the links for raising or lowering the implement through the links and the suspenders. The lift unit permits upward or downward movement and sidewise tilting of the entire implement due to the pivotal movement of each of the links independent of the other link.

9 Claims, 5 Drawing Sheets

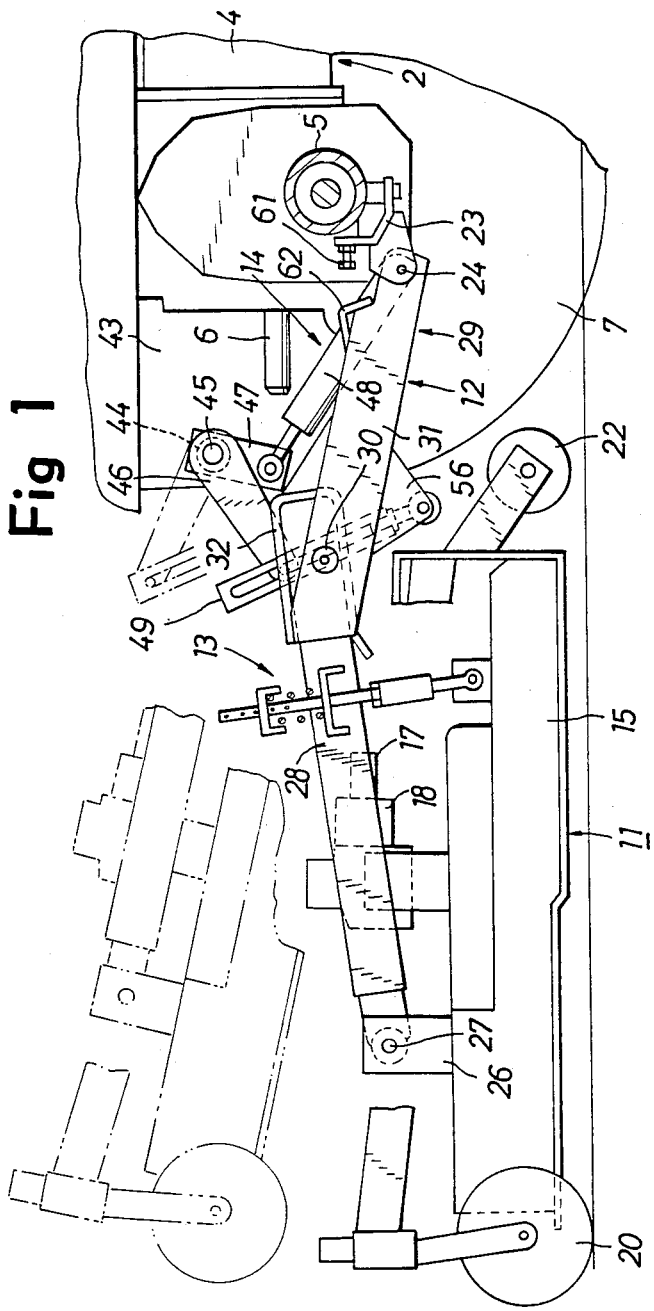
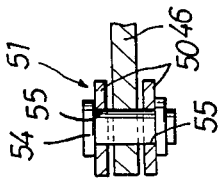
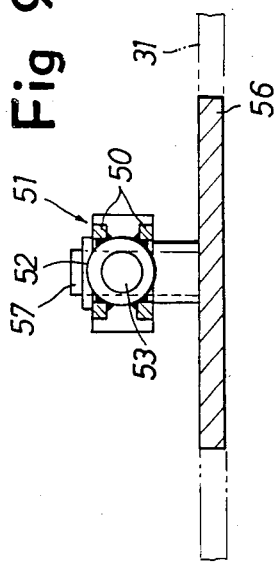

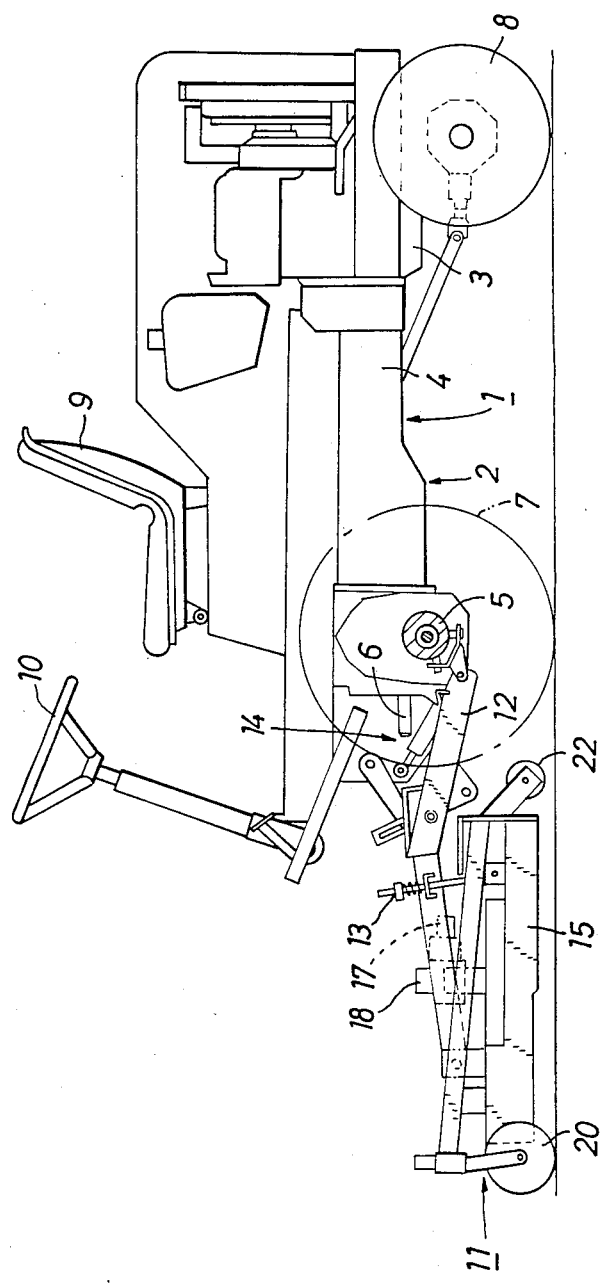

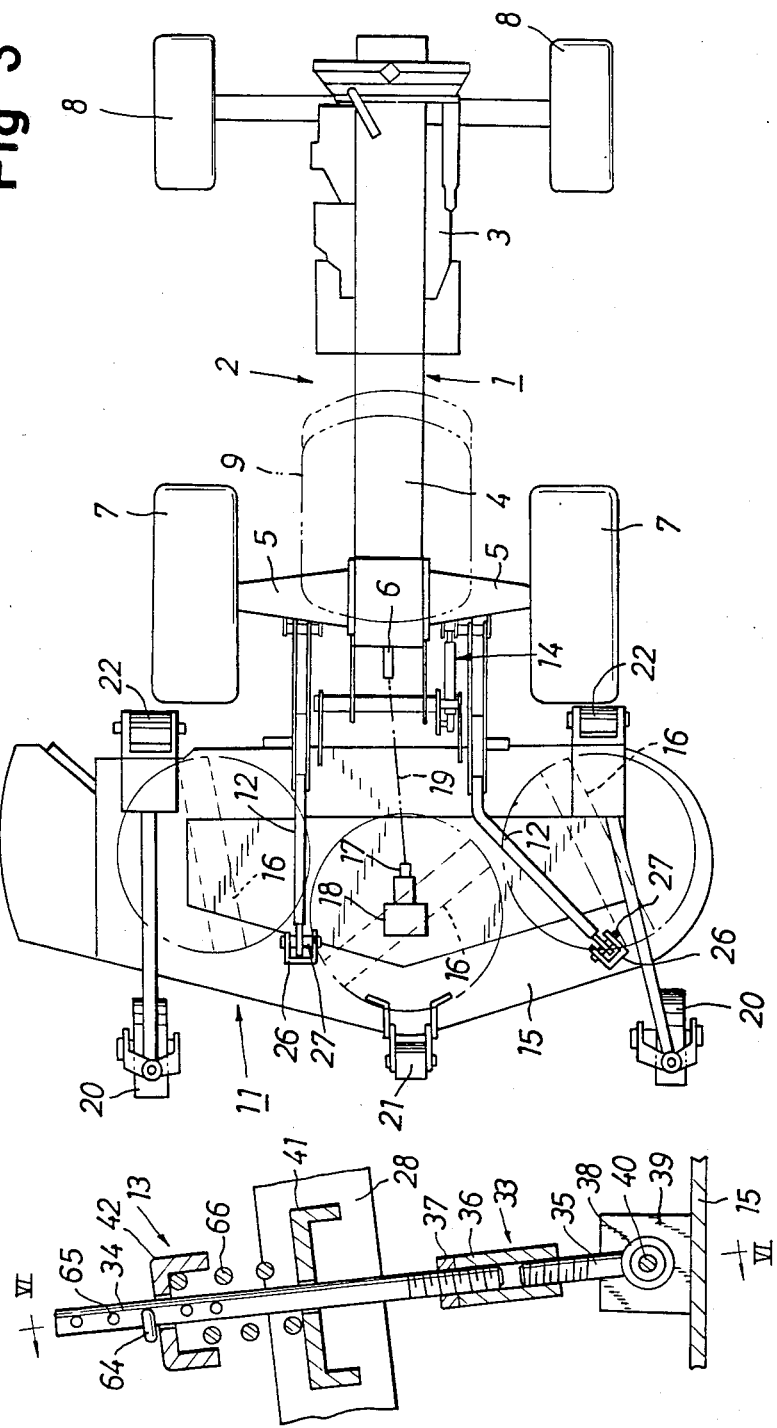

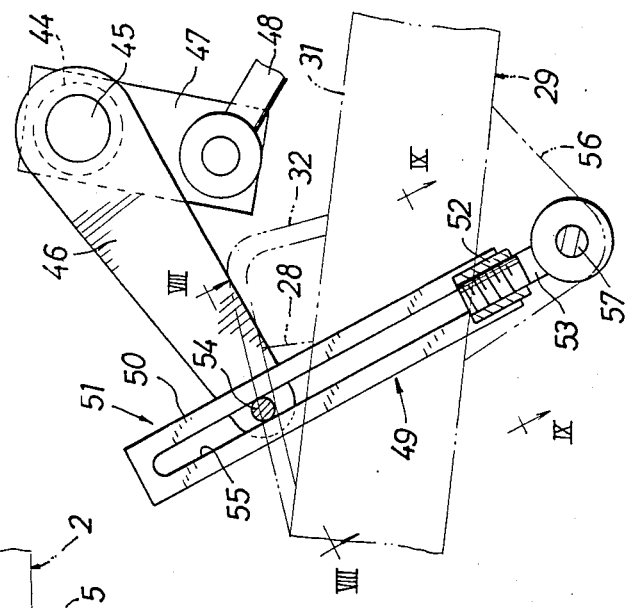
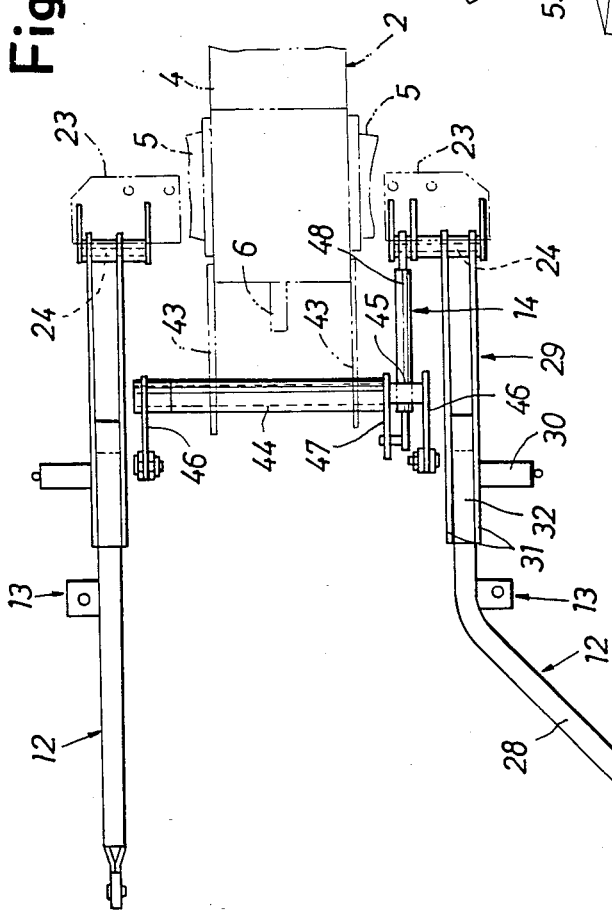

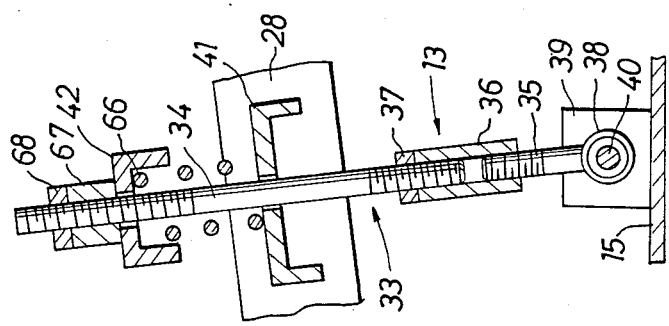
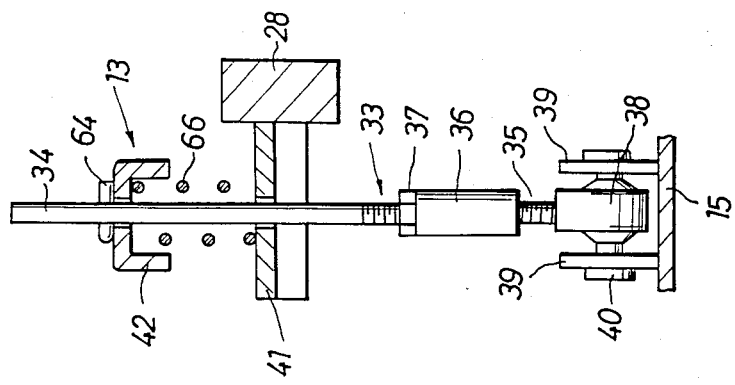

ATTACHMENT DEVICE FOR FRONT-MOUNTABLE WORKING IMPLEMENT

FIELD OF THE INVENTION AND RELATED ART STATEMENT

The present invention relates to an attachment device for a front-mountable working implement, and more particularly to a device for vertically movable attaching to the front of a running vehicle a working implement for performing work while following the ground surface.

Front-mounted mowers positioned in front of tractors for cutting grass while following the ground surface are attached to the tractor, for example, by a device comprising a pair of opposite inflexible links pivoted at their rear ends to the front of the tractor upwardly or downwardly movably and each having a front end supporting the front portion of the mower movably about a lateral pivot, a pair of suspenders each mounted on a longitudinally intermediate portion of each of the links and suspending the corresponding side of the mower at its rear portion, each of the suspenders having means for permitting upward or downward movement of the mower rear portion due to the movement of the mower about the pivot, and a lift unit provided between the tractor and the links for raising or lowering the mower through the links and the suspenders.

With the above device, the mower rear portion is allowed to move upwardly or downwardly about the pivot for connecting the mower to the link, so that even when there are stones or like obstacles on the ground, the upward or downward movement of the mower permits the mower rear portion to easily pass over the obstacles.

However, the two links of the above device are restrained by the lift unit and almost prevented from pivotally moving freely upwardly or downwardly even during working.

Consequently, the mower is almost unable in its entirety to move upwardly or downwardly or to tilt sidewise during working, failing to smoothly follow forward or rearward or sidewise slopes and irregularities on the ground surface and rendering the mower front portion unable to smoothly pass over obstacles.

The conventional device has another problem in that the suspenders are not provided with any spring or like resilient member for mitigating the upward or downward jolting movement of the mower so that the mower rattles and produces a lot of noise when the vehicle is driven on the road with the mower in a lifted position.

OBJECTS AND SUMMARY OF THE INVENTION

A first object of the present invention is to make it possible for the front-mounted working implement to smoothly follow forward, rearward or sidewise slopes or surface irregularities on the ground.

A second object of the present invention is to enable the front portion of the front-mounted working implement to smoothly pass over obstacles.

A third object of the present invention is to enable vehicles to run on the road with a working implement attached to the front thereof and held in a lifted position without permitting the implement to rattle or to produce a lot of noise.

To fulfill these objects, the present invention provides a device of the following construction.

According to the present invention, a pair of opposite inflexible links are pivoted at their rear ends to the front of a running vehicle upwardly or downwardly movably, and a front-mountable working implement for performing work while following the ground surface as positioned in front of the vehicle is supported at its front portion by the front ends of the links movably about lateral pivots. The rear portion of the working implement is supported in suspension by a pair of suspenders each mounted on a longitudinally intermediate portion of each link. Each of the suspenders includes a rod assembly pivoted to the rear portion of the working implement and a resilient member. The rod assembly is inserted in an upstanding state through the link and is movable along its own axis to thereby permit upward or downward movement of the implement rear portion due to the movement of the implement about the pivots.

The resilient member is provided around an upper portion of the rod assembly above the link and elastically deformably bears against the link.

A lift unit is provided between the vehicle and the links for raising or lowering the working implement through the links and the suspenders. The lift unit has means for permitting upward or downward movement and sidewise tilting of the entire working implement due to the pivotal movement of each of the links independent of the other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a fragmentary side elevation of the present invention;

FIG. 2 is an overall side elevation of the present invention;

FIG. 3 is an overall plan view of the present invention;

FIG. 4 is a plan view showing part of FIG. 1;

FIG. 5 is a side elevation in vertical section showing a suspender;

FIG. 6 is a view partly in section and showing the suspender as it is seen in the direction of arrows VI—VI in FIG. 5;

FIG. 7 is a side elevation partly in section and showing a lift unit;

FIGS. 8 and 9 are views in section taken along the line VIII—VIII and the line IX—IX in FIG. 7, respectively; and FIG. 10 is a side elevation in vertical section showing another suspender embodying the invention.

DESCRIPTION OF THE PREFERRED EMBODIMENTS

An embodiment of the present invention will be described below with reference to FIGS. 1 to 9. Referring to FIGS. 2 and 3, a tractor 1 is shown as an example of a running vehicle. This Tractor 1 has a body 2 comprising an engine 3 and a transmission case 4 which are arranged with the transmission case 4 forward of the engine 3.

The front portion of the transmission case 4 has a pair of front axle cases 5 projecting outwardly from its opposite sides and a front PTO shaft 6 projecting forwardly from its front side.

The transmission case 4 houses a running system transmission for selectively driving front wheels 7 or rear wheels 8. The transmission is also adapted to drive both the front wheels 7 and the rear wheels 8 at the same time. The rear wheels 8 are steering wheels.

A seat 9 is disposed toward the front of the vehicle body 2. Steering means 10 for steering the rear wheels 8 is provided at the front end of the body 2 in front of the seat 9.

A front-mounted mower 11 is shown as an example of a front-mounted working implement. This mower 11 is removably attached to the front and leftward side vehicle body 2 by links 12, suspenders 13 and a lift unit 14. Thus, the mower 11 is positioned in front of the front wheels 7.

The mower 11 has a mower deck 15 which is open downwardly. Provided under the mower deck 15 are three rotary cutters 16 which are arranged side by side substantially transversely of the vehicle body.

An input case 18 having an input shaft 17 is provided at the midportion of the deck 15. The input shaft 17 is connected to the front PTO shaft 6 by a universal joint shaft 19.

A pair of opposed, vertically adjustable front gauge wheels 20 are provided in front of the mower deck 15 for adjusting the height for the cutters 16 to cut grass or the like.

A front limit gauge wheel 21 is mounted on the front edge of the mower deck 15 at the midportion thereof transversely of the vehicle, while the rear edge of the deck 15 is provided with a pair of opposed rear limit gauge wheels 22. These gauge wheels 21 and 22 hold the mower deck 15 off the ground.

As shown also in FIG. 1, the a pair of links 12 are provided on opposite sides of the body 2, are inflexible and are generally inverted V-shaped when seen in side elevation, such that a longitudinally intermediate portion of each link 12 is at a higher level than the front and rear ends thereof.

The link 12 is supported by a lateral pivot 24 on a bracket 23 fixed to the front axle case 5 and is movable upwardly or downwardly about the pivot 24.

The front end of each link 12 and a ball joint 25, to which the front portion of the mower deck 15 is connected at each side thereof by a bracket 26 and a lateral pivot 27. Thus, each side of the mower deck front portion is movable about the lateral pivot 27 and is also movable by the action of the ball joint 25, relative to the front end of the link 12.

When the mower 11 is in its usual working position as indicated in solid lines in FIG. 1, the pivot 24 is at a lower level than the pivot 27.

The link 12 comprises front and rear link members 28, 29 and fastening means 30 for separably connecting the two link members 28, 29 together. The rear link member 29 comprises a pair of opposed side plates 31 and a socket frame 32 fixed to the front portions of the side plates 31 for removably receiving the rear end of the front link member 28. The socket frame 32 is opened forward.

Each front axle case 5 has a stopper 61 projecting forwardly which is adjustable in the amount of forward projection. Opposed to the stopper 61 is an inverted V-shaped contact plate 62 secured to a rear portion of the rear link member 29 of each link 12. The contact of the plate 62 with the stopper 61 limits the upward movement of the link 12, i.e., the mower 11.

The suspenders 13 are provided in a pair on the opposite links 12. The rear portion of the mower deck 15 is suspended at each side thereof from a rear portion of the front link member 28 of each link 12 by the suspender 11.

The suspender 13 functions to adjust the height of grass or the like to be cut by the cutters 16 and comprises a rod assembly 33 and a resilient member 66 as shown also in FIGS. 5 and 6. A spring is shown as an example of resilient member 66.

The rod assembly 33 has a turnbuckle structure and comprises upper and lower rods 34, 35, a tube 36 and a nut 37. The tube 36 has at its upper and lower ends a pair of internally threaded portions which are opposite-handed to each other, and the opposed ends of the upper and lower rods 34, 35 are screwed into the threaded ends axially movably. The nut 37 is screwed on one of the opposed ends of the upper and lower rods 34, 35, in pressing contact with the corresponding end of the tube 36.

The lower rod 35 has at its lower end a ball joint 38 which is rotatably supported by a lateral connecting pin 40 between a pair of opposite lugs 39 on the mower deck 15.

The front link member 28 of each link 12 has a channel-shaped lower bearing member 41 projecting outwardly from the outer side of a rear portion of the link member. The upper rod 34 is inserted through the lower bearing member 41 and is movable along its own axis. The upper rod 34 extends upwardly and is inclined in the forward direction.

An upper bearing member 42 in the form of a flanged disk is fitted around a lengthwise intermediate portion of the upper rod 34 and is moved axially of the rod. The upper rod 34 is formed with a plurality of pin holes 65 as arranged axially thereof. A beta-shaped pin 64, as an example of restraining member, is removably inserted through one of the pin holes 64 for restraining the upper bearing member 42 from moving upwardly.

The resilient member 66 is wound around an upper portion of the upper rod 34 and is elastically deformably provided between the upper and lower bearing members 42 and 41 in bearing contact therewith.

As shown also in FIGS. 7 to 9, the lift unit 14 for raising or lowering the mower 11 through the links 12 and the suspenders 13 has the following construction.

Two opposed support plates 43 extend from the opposite front side portions of the transmission case 4. A tubular member 44 extending transversely of the vehicle body is secured to the support plates 43.

A rotary shaft 45 is inserted through the tubular member 44 rotatably about its own axis and fixedly provided at its opposite ends with a pair of coupling levers 46 projecting forwardly. A moving lever 47 projecting downwardly is fixed to the rotary shaft 45 at a portion thereof toward the left end.

A double-acting stretchable hydraulic cylinder 48 is connected between the moving lever 47 and the left bracket 23 at the front portion of the body 2.

A suspending member 49 is connected between each coupling lever 46 and the link 12 adjacent thereto. The suspending member 49 comprises a main body 51, nut 52 and connector 53.

The main body 51 extends upwardly and is elongated in an inverted U-shape and includes a pair of opposed side plates 50 connected together at their upper ends. Each side plate 50 has a slot 55 extending longitudinally therealong.

The forward end of the coupling lever 46 is inserted between the opposed side plates 50 of the main body 51 and is movable upwardly or downwardly. A connecting pin 54 is removably inserted through the forward end of the coupling lever 46 transversely thereof. The opposite ends of the pin 54 are inserted in the slots 55 in the side plates 50 of the main body 51 and are removable therefrom and are movable along the slots.

The nut 52 is inserted in the lower end of the main body 51 and secured thereto. The connector 53 is removably screwed in the nut 52 and projects downwardly therefrom. The connector 53 has its lower end removably connected to a bracket 56 by a connecting pin 57. The bracket 56 is fixed to a longitudinally intermediate portion of the inner side plate 31 of the rear link member 29 of the link 12. The bracket 56 projects downwardly the lower edge of the intermediate portion.

The embodiment described above is used for mowing in the following manner. As indicated in solid lines in FIG. 1, the front gauge wheels 20 are brought into contact with the ground, the rear portion of the mower 11 is suspended from the links 12 by the suspenders 13, and the connecting pins 54 are positioned in the slots 55 of the main bodies 51 at a lengthwise intermediate portion thereof.

With the cutters 16 driven with power delivered from the front PTO shaft 6 to the input shaft 17, the mower 11 is pushed forward by the tractor 1, whereby grass or the like is cut by the cutters 16 and discharged toward the right side of the path of travel of the tractor.

During mowing operation, the rod assembly 33 of each suspender 13 is movable axially thereof relative to the lower bearing member 41 on the link 12, and the mower 11 is pivotally movable about the pivots 27, so that the rear portion of the mower 11 is movable upwardly or downwardly and is thereby allowed to easily pass over stones or like obstacles on the ground.

In the lift unit 14, the connecting pins 54 are movable through the slots 55 of the main bodies upwardly or downwardly, permitting each of the links 12 to pivotally move upwardly or downwardly independently of the other link and consequently allowing the entire mower 11 to move upwardly or downwardly or tilt toward one side. This results in the following advantages.

The upward or downward movement of the entire mower 11 enables the mower front portion to readily pass over obstacles on the ground, while this mode of upward or downward movement of the mower 11 about the pivots 27 permits the mower 11 to smoothly follow ground surface irregularities or slopes with respect to the direction of travel of the tractor.

Further the sidewise tilting of the mower 11 permits the mower 11 to smoothly follow surface irregularities on the ground or slopes with respect to the sidewise or transverse direction.

Further during the mowing operation described above, the pivots 24 are at a lower level than the pivots 27, so that when pushing the mower 11 forward for mowing, the tractor 1 exerts no downward force on the mower 11 through the links 12, permitting the entire mower 11 to smoothly move upwardly or downwardly or tilt sidewise, to pass over obstacles on the ground more easily and to follow surface irregularities or slopes with improved smoothness. adjustable by moving the front gauge wheels 20 upwardly or downwardly and inserting the beta-shaped pin 64 of each suspender 13 into a different pin hole 65 with the mower rear portion in a lifted position.

When the tractor 1 equipped with the mower 11 is to be driven on the road, the piston of the hydraulic cylinder 48 is advanced to cause the moving lever 47 and the rotary shaft 45 to raise the coupling levers 46 and position the connecting pins 54 at the upper ends of the slots 55 in the main bodies 51, further causing the suspending members 49 to lift the links 12, whereby the mower 11 is brought to a lifted position indicated in phantom lines in FIG. 1.

When the tractor is driven on the road with the mower 11 in its lifted position as stated above, the resilient member 66 of each suspender 13 provided between the upper and lower bearing members 42, 41 in bearing contact therewith absorbs the resulting impact, preventing the mower 11 from rattling greatly or producing a lot of noise.

It is also possible to attach to the tractor 1 a front-mountable working implement other than the mower 11, such as a snowplow, blade or the like. In this case, the front link members 28 of the links 12 are disconnected from the rear link members 29 thereof, and the mower 11 with the front link members 28 connected thereto is removed from the tractor 1. The working implement to be substituted and having like front link members 28 connected thereto is then attached to the tractor 1.

Since the hydraulic cylinder 48 is of the double-acting type, the working implement can be pressed against the ground during working. This assures satisfactory work, for example, with the use of a blade.

FIG. 10 shows another embodiment of the invention, wherein the restraining member for restraining the upper bearing member 42 from moving upwardly comprises an adjusting nut 67 and a locknut in place of the beta-shaped pin. These nuts 67 and 68 are removably screwed on the upper rod 34 above the upper bearing member 42.

Although the ball joint 38 is provided at the lower end of the rod assembly 33 of the first embodiment, the lower end of the rod assembly 33 may alternatively be merely formed with a hole for inserting the connecting pin 40 therethrough. While the lift unit 14 of the embodiment has the connecting pins 54 which are movably inserted in the slots 55 for permitting the mower 11 to move upwardly or downwardly or otherwise, a chain or other means may be used in place of the connecting pin 54, slot 55, etc. Rubber or the like may be used for the resilient member 66.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An attachment device for a front-mountable working implement for performing work while following a ground surface and while being positioned in front of a vehicle, said attachment device comprising:
a pair of opposed inflexible links having front and rear ends, each of said links being pivoted at their rear ends to the front of said vehicle and each link being upwardly and downwardly movable about a pivot at said front of said vehicle, each of said front ends of said links pivotably supporting a front portion of said working implement about a lateral pivot thereon;
a pair of opposed suspenders each mounted on one of said links at an intermediate portion thereof, said suspenders suspending a rear portion of said working implement, each of said suspenders having a rod assembly, a compressible resilient member and a restraining member, each of said rod assemblies being pivotably connected to the rear portion of said working implement and being inserted through one of said links in order for each of said links to have one rod assembly therethrough, each of said rod assemblies being longitudinally reciprocable to permit upward and downward movement of the rear portion of said working implement about said lateral pivot between the front portion of said working implement and the front ends of said links, each of said restraining members being fixed on one of said rod assemblies in order for each rod assembly to have one restraining member thereon, said link members being positioned between said restraining members and said working implement, each of said compressible resilient members extending between one of said links and one of said restraining members and each of said compressible resilient members being elastically deformable; and
a lift unit provided between said vehicle and said links for raising and lowering the working implement through the links and suspenders, the lift unit having means for permitting upward and downward and sideways tilting movement of the working element due to pivotal movement of each of the links independent of one another.

2. The attachment device as defined in claim 1 wherein each of the links are shaped to position a longitudinally intermediate portion thereof at a higher level than the front and rear ends thereof and wherein each link has a pivot about which the rear end of each link is supported on the vehicle at a position lower than the lateral pivot at which the front end of the links are attached to the working implement.

3. The attachment device as defined in claim 1 wherein each of the links comprises front and rear link members and fastening means for connecting the front link member to the rear link member of each of said links, and each of the rear link members have a socket frame for removably receiving a rear end of the front link member.

4. The attachment device as defined in claim 1 wherein each of the rod assemblies comprise upper and lower rods, a tube and a nut, and each of the tubes has at its upper and lower ends a pair of internally threaded portions opposite-handed to each other, the opposed ends of each of the upper and lower rods being screwed into the threaded portions, each of the nuts being screwed on one of the opposed ends of each of the upper and lower rods in pressing contact with the corresponding end of each of the tubes.

5. The attachment device as defined in claim 1 wherein each of the links have a lower bearing member laterally projecting outward from a longitudinally intermediate portion thereof, and each of the rod assemblies are inserted along an axial midportion through one of the lower bearing members and being movable in a direction parallel to a longitudinal axis of each rod assembly, each of said rod assemblies further having an upper bearing member being fitted around an upper portion thereof and being located above said lower bearing members and being movable with said rod assemblies, and each of said restraining members being fixed to said upper portion of the rod assembly above the upper bearing member for restraining upward movement of the upper bearing member, each of the resilient members being a coiled compression spring and being provided between one of the upper bearing members and the lower bearing members in bearing contact therewith.

6. The attachment device as defined in claim 5 wherein each of the restraining members is a beta-shaped pin removably inserted through each of the rod assemblies.

7. The attachment device as defined in claim 5 wherein each of the restraining members comprises a pair of nuts removable screwed on each of the rod assemblies.

8. The attachment device as defined in claim 1 wherein the lift unit comprises a rotatable shaft extending transversely at the front of the vehicle and supported rotatably about its own axis, a moving lever secured to the rotatable shaft, a pair of coupling levers fixed to the opposite ends of the rotatable shaft, a double-acting hydraulic cylinder connected between the moving lever and the front portion of the vehicle, and a pair of opposed suspending members each connected between each coupling lever and the link adjacent thereto.

9. The attachment device as defined in claim 8 wherein each of the suspending members comprises an elongated main body extending upwardly, a nut and a connector screwed in the nut, and the main body includes a pair of opposed side plates connected together at their upper ends and each having a longitudinal slot, the forward end of the coupling lever being inserted between the opposed side plates and being movable upwardly and downwardly and being provided with a transverse connecting pin, the pin being inserted in and movable along the slots of the side plates, the nut being fixed to the lower ends of the side plates, and the connector being pivoted to a longitudinally intermediate portion of the link.

* * * * *